US012767315B2

(12) United States Patent
Roth et al.

(10) Patent No.: US 12,767,315 B2
(45) Date of Patent: Oct. 20, 2026

(54) AIRCRAFT SECTION HAVING A SIMPLIFIED RAPID DECOMPRESSION ARCHITECHTURE

(71) Applicant: Airbus Operations GmbH, Hamburg (DE)

(72) Inventors: Ingo Roth, Hamburg (DE); Nitish Bhardwaj, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 19/070,167

(22) Filed: Mar. 4, 2025

(65) Prior Publication Data

US 2025/0289559 A1 Sep. 18, 2025

(30) Foreign Application Priority Data

Mar. 18, 2024 (IN) ............................ 202411019957
May 2, 2024 (EP) .................................... 24173769

(51) Int. Cl.
*B64C 1/18* (2006.01)
*B64C 1/00* (2006.01)

(52) U.S. Cl.
CPC .......... *B64C 1/18* (2013.01); *B64C 2001/009* (2013.01)

(58) Field of Classification Search
CPC ................................................ B64C 2001/009
See application file for complete search history.

(56) References Cited

U.S. PATENT DOCUMENTS

| | | | | |
|---|---|---|---|---|
| 5,118,053 | A * | 6/1992 | Singh | B64C 1/18 244/129.1 |
| 2009/0159748 | A1 | 6/2009 | Treimer et al. | |
| 2010/0320318 | A1* | 12/2010 | Roth | B64C 1/066 244/118.5 |
| 2012/0043421 | A1 | 2/2012 | Voss et al. | |
| 2012/0214393 | A1 | 8/2012 | Vogt et al. | |
| 2017/0144744 | A1 | 5/2017 | Schneider | |
| 2018/0127100 | A1 | 5/2018 | Roth | |

FOREIGN PATENT DOCUMENTS

DE 102016121366 A1 5/2018

OTHER PUBLICATIONS

European Search Report for corresponding European Patent Application No. 24173769 dated Oct. 10, 2024.

* cited by examiner

*Primary Examiner* — Joshua D Huson
*Assistant Examiner* — Anna L. Gordon
(74) *Attorney, Agent, or Firm* — Greer, Burns & Crain, Ltd.

(57) ABSTRACT

An aircraft section comprising a primary structure forming at least a portion of an aircraft fuselage, a cabin floor coupled to the primary structure, a sidewall covering at least a portion of the primary structure, and a rapid decompression unit arranged between the sidewall and the primary structure. The sidewall has a certain distance to the cabin floor and the rapid decompression unit has a certain distance to the sidewall.

8 Claims, 3 Drawing Sheets

AIRCRAFT SECTION HAVING A SIMPLIFIED RAPID DECOMPRESSION ARCHITECHTURE

CROSS-REFERENCES TO RELATED APPLICATIONS

This application claims the benefit of Indian patent application Ser. No. 202411019957 filed on Mar. 18, 2024 and European Application Number 24173769.1 filed on May 2, 2024, the entire disclosures of which are incorporated herein by way of reference.

FIELD OF THE INVENTION

The present disclosure generally relates to an aircraft section having a rapid decompression unit, as well as an aircraft having such aircraft section. Particularly, the aircraft section has a sidewall covering a primary structure of the aircraft and a rapid decompression unit, wherein distances between the sidewall and a cabin floor as well as between the sidewall and the rapid decompression unit allow a regular flow of exhaust air removed from the aircraft cabin.

BACKGROUND OF THE INVENTION

A conventional removal of air from a passenger cabin of an aircraft is achieved by dedicated (secondary) structures arranged in a corner area of the passenger cabin at a cabin floor and a side of the fuselage of the aircraft. For instance, specific slit panels or grills can be arranged in this region or in a sidewall (lining) covering the primary structure of the fuselage, which each allow removal of exhaust air from the passenger cabin through the slits or grills.

Since such structures/panels perform an important function, i.e., removal of air from the passenger cabin, they are subject of specific admission and certification processes by corresponding authorities.

Moreover, a passenger cabin must be designed that a sudden pressure increase or decrease (pressure drop) is equalized in a very fast manner. To do so, the structures and/or panels are usually equipped with a rapid decompression unit. As a mere example, DE 10 2016 121 366 B4 relates to a flap that opens in case of a predefined pressure difference between the passenger cabin and an exterior space, thereby providing a larger cross-section for an airstream into or out of the passenger cabin.

However, such complex structures and/or panels require admission and certification by authorities, so that the development and manufacturing thereof is time-consuming and expensive.

SUMMARY OF THE INVENTION

It is therefore an object of the present disclosure to provide an aircraft section having an improved air removal and decompression capability.

This object may be solved by one or more of the embodiments described herein.

According to a first aspect to better understand the present disclosure, an aircraft section comprises a primary structure forming at least a portion of an aircraft fuselage, a cabin floor coupled to the primary structure, a sidewall covering at least a portion of the primary structure, and a rapid decompression unit arranged between the sidewall and the primary structure.

The sidewall has a bottom edge arranged above the cabin floor, wherein a first distance between the bottom edge and the cabin floor is between 1 inch and 3 inch (25.4 mm to 76.2 mm), preferably between 1.5 inch and 2 inch (38.1 mm to 50.8 mm). For example, the first distance can be 2 inch (50.8 mm). Thus, when contemplating a cross-section through the aircraft section, particularly a cross-section perpendicular to a longitudinal direction of the aircraft, the sidewall ends above the cabin floor. The gap between the cabin floor and the bottom edge of the sidewall allows an air flow from the passenger cabin towards an area behind the sidewall and vice versa. The first distance allows a sufficient volume flow to exchange the air in the passenger cabin in accordance with standard regulations.

Furthermore, the rapid decompression unit is mounted to the primary structure and the cabin floor. A second distance between the sidewall and a portion of the rapid decompression unit closest to the sidewall is between 1 inch and 2 inch (25.4 mm to 50.8 mm), preferably between 1 inch and 1.5 inch (25.4 mm to 38.1 mm). For example, the second distance can be 1 inch (25.4 mm). Thus, again with respect to the cross-section through the aircraft section perpendicular to the longitudinal direction of the aircraft, a gap between and exterior side of the sidewall (facing the primary structure) and the rapid decompression unit has a thickness of at least the second distance. Again, the second distance allows a sufficient volume flow to exchange the air in the passenger cabin in accordance with standard regulations.

As a mere example, the rapid decompression unit can extend from the cabin floor upwards, for example, substantially parallel to the primary structure. Therefore, the exhaust air removed from the passenger cabin flows through the gap between the bottom edge of the sidewall and the cabin floor and along the rapid decompression unit (as well as along the exterior side of the side wall).

The aircraft section allows removal of air from the passenger cabin, while the sidewall can be a simple sidewall, i.e., without any structures, panels or grills. Thus, the sidewall does not require a complex admission and certification, as it is a simple non-functional secondary aircraft component. Only the rapid decompression unit requires admission and certification. However, the rapid decompression unit is less complex compared to conventional sidewall-decompression combinations.

Furthermore, the rapid decompression unit is only mounted to the primary structure and the cabin floor, but is not mounted to the sidewall. This further simplifies the sidewall and avoids special admission and certification processes for the sidewall.

In an implementation variant, the rapid decompression unit can comprise an opening, a flap and a joint, to which the flap is pivotally mounted. The flap can be configured to close the opening when in a closed position. Thus, when the flap is in the closed position, the rapid decompression unit simply forms a baffle or guide plate for the air removed from the passenger cabin and streaming in the space between the sidewall and the rapid decompression unit. Likewise, the rapid decompression unit forms a baffle or guide plate for the air streaming between the rapid decompression unit and the primary structure towards a space outside of the passenger cabin, for example, towards an air-conditioning device.

Therefore, although the rapid decompression unit requires admission and certification due to decompression purposes, the rapid decompression unit can be less complex compared to conventional decompression units. As a mere example, the disclosed rapid decompression unit can form a simple baffle or guide plate, where only one moving part is provided, i.e., the flap.

In an implementation variant, the flap can be configured to move between the closed position and two opposite open positions, where the flap is deflected in one of two opposite directions away from the opening. In other words, depending on the pressure difference between the passenger cabin and an exterior space (i.e., an overpressure or low pressure), the flap can open towards the low pressure side. As a mere example, if the pressure in the passenger cabin drops, the flap can move towards the sidewall allowing air to stream through the opening of the rapid decompression unit into the space behind the sidewall and through the gap between sidewall and cabin floor into the passenger cabin.

In an implementation variant, the flap can be biased, so that the flap moves into the closed position, if the pressure difference between passenger cabin and exterior space is under a certain threshold (i.e., under a pressure difference triggering the opening of the flap solely by the pressure difference). As a mere example, one or more springs or similar biasing elements can be provided that push(es) the flap towards the closed position. Thus, if the pressure difference increases, the flap may still be in the closed position, until the threshold pressure difference is reached. If the pressure difference further increases, the flap opens and allows decompression.

In an implementation variant, the flap can be arranged in such a manner that gravity facilitates moving the flap into the closed position. For instance, the joint can be provided at an upper end of the flap, and in the closed position the flap is substantially vertically arranged. It is to be understood that substantially vertically includes an arrangement at an angle with respect to a vertical line, such as +/−10° to 15°. In other words, substantially vertically does not exclude the flap from deviating from a vertical orientation, for example, due to a biasing element or the like. Thus, the rapid decompression unit can be installed at any angle required and/or optimized for the location between the primary structure and the sidewall.

In an implementation variant, the rapid decompression unit can be mounted to the primary structure at a minimum distance from an inner side of the primary structure. Thus, a gap or slot is formed between the rapid decompression unit and the primary structure. Through this gap or slot air can move, for example, when leaving the passenger cabin. This pertains the case where the flap is in the closed position (regular exhaust air removal from the passenger cabin), as well as when the flap is in one of the open positions (decompression situation).

In an implementation variant, the minimum distance between an inner side of the primary structure and the rapid decompression unit can be at least 1 inch (a minimum of approximately 25.4 mm). Such thickness of the gap or slot "behind" the rapid decompression unit is usually sufficient for regular exhaust air removal. The larger the minimum distance is, the faster is the rapid decompression through the opening. As a mere example, the minimum distance can correspond to the first distance.

In an implementation variant, the inner side of the primary structure can be the innermost section of a frame, a stringer or the like. Likewise, an inner side of an insulation material provided at or in the fuselage of the aircraft can also form an inner side of the primary structure, as it delimits the gap or slot "behind" the rapid decompression unit (i.e., the gap or slot between an exterior side of the rapid decompression unit and an interior side of any primary structure or the like).

In an implementation variant, a main portion of the sidewall can be arranged substantially parallel to the primary structure, and a bottom region of the sidewall can diverge from the primary structure. In other words, the bottom region of the sidewall has an increasing distance from the primary structure. This provides for room to install the rapid decompression unit particularly behind the bottom region of the sidewall. In addition, this form of the sidewall allows sufficiently sized gaps or slots between the sidewall and the rapid decompression unit as well as between the rapid decompression unit and the inner side of the primary structure.

As a mere example, the space defined by the bottom region of the sidewall and the primary structure can be divided in half by the rapid decompression unit.

In an implementation variant, the bottom region can cover the rapid decompression unit. Thus, the rapid decompression unit is not visible for any passengers in the cabin (or at least partly visible through the gap having the first distance), and is further not accessible (or at least very difficult to access) for passengers. This arrangement together with the gap between the bottom edge of the sidewall and the floor prevents objects from entering the space around the rapid decompression unit, which could hinder the flap from opening in a decompression situation.

According to a second aspect to better understand the present disclosure, an aircraft comprises at least one aircraft section of the first aspect or one or more of its variants.

As a mere example, the aircraft may comprise a passenger cabin that spans over the width of the aircraft and extends in a longitudinal direction of the aircraft. On each side of the passenger cabin, a plurality of aircraft sections can be provided, i.e., a plurality of sidewalls (or one single continuous sidewall) with rapid decompression units can be provided, according to the first aspect. This allows a regular exhaust air removal along the entire passenger cabin as well as a decompression of the passenger cabin, if required. For instance, the rapid decompression units having a respective opening form an opening for rapid decompression almost as long as the passenger cabin. Only structural parts of the rapid decompression unit connecting portions of the rapid decompression unit above and below the opening may be required that interrupts a longitudinal extension of the openings.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
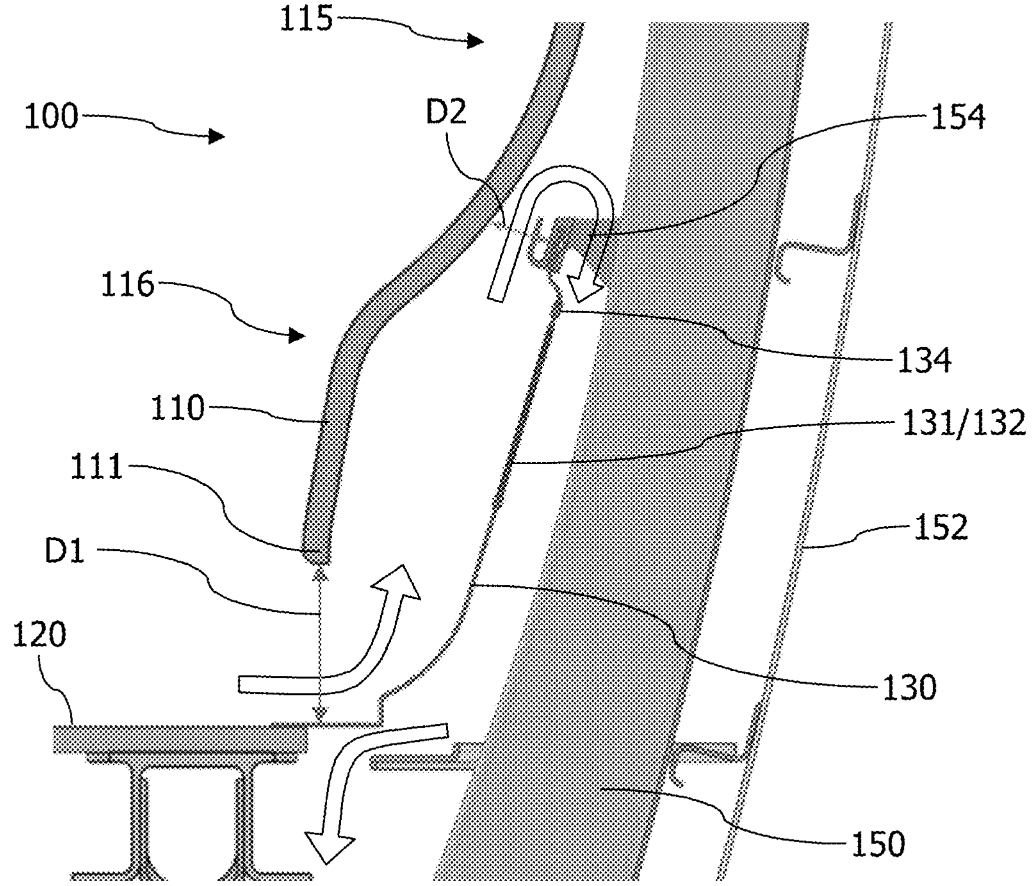
FIG. 1 schematically illustrates a cross-sectional view of an exemplary aircraft section.

FIG. 1 schematically illustrates a cross-sectional view of an exemplary aircraft section 100. The aircraft section 100 pertains a lower corner area at a side of a passenger cabin. The aircraft section 100 comprises a primary structure 150, which in FIG. 1 is an exemplary frame. The primary structure 150 forms at least a portion of an aircraft fuselage (cf. FIG. 3). The aircraft section 100 further comprises a cabin floor 120 coupled to the primary structure 150. FIG. 1 does not explicitly illustrate a connection between the cabin floor 120 and the primary structure 150 for increased clarity of the drawing. Such connection can be arranged, for example, underneath what is illustrated in FIG. 1. In any case, a gap between a side edge of the cabin floor 120 and the primary structure 150 can be provided to allow air to stream between the areas above and underneath the cabin floor 120.

The aircraft section 100 further comprises a sidewall 110 covering at least a portion of the primary structure 150. For instance, the sidewall 110 can be arranged substantially parallel to the primary structure 150, and forms a visible interior surface of the passenger cabin. As will be explained in more detail below, a main portion 115 of the sidewall 110 is arranged substantially parallel to the primary structure 150, while a bottom region 116 of the sidewall 110 diverges from the primary structure 150. In other words, in the bottom region 116, a distance between the sidewall 110 and the primary structure 150 is greater than at the main portion 115. The sidewall 110 can be connected or coupled to the primary structure 150 at clips or the like (not illustrated) that can be arranged at a position higher than the bottom region 116.

The aircraft section 100 further comprises a rapid decompression unit 130 arranged between the sidewall 110 and the primary structure 150. As is exemplarily illustrated in FIG. 1, the rapid decompression unit 130 forms a baffle or guiding plate that runs from the cabin floor 120 up to a mounting position 154 at the primary structure 150. Such mounting position 154 can be a clip, protrusion, rail, bar or the like.

As is illustrated in FIG. 1 by wide arrows, exhaust air can be removed from the passenger cabin towards the space underneath the cabin floor 120. Usually an air conditioning system (not illustrated) of the passenger cabin provides (blows) fresh air into the passenger cabin and receives (sucks) exhaust air. Such air-conditioning system is regularly arranged in a lower area of the aircraft 1 (FIG. 3), such as in a cargo area or the like underneath the cabin floor 120. Thus, exhaust air is streaming behind the sidewall 110, around the rapid decompression unit 130 (at a location corresponding to the mounting position 154) and behind the rapid decompression unit 130 towards the space underneath the cabin floor 120.

The sidewall 110 has a bottom edge 111 arranged above the cabin floor 120, hence, forming a gap of distance D1. Such gap is sufficiently sized to allow removal of the exhaust air from the passenger cabin as well as allow rapid decompression. It is to be understood that the cross-section illustrated in FIG. 1 can be taken anywhere along the longitudinal extension of the passenger cabin. Thus, the gap underneath the bottom edge 111 of the sidewall 110 also extends along the longitudinal direction of the aircraft 1, forming a long slit through which exhaust air can be removed and rapid air decompression can be achieved.

As a mere example, the distance D1 can be between 1 inch and 3 inch (25.4 mm to 76.2 mm), preferably between 1.5 inch and 2 inch (38.1 mm to 50.8 mm). For instance, a 2 inch (50.8 mm) distance D1 was found to be sufficiently large for exhaust air removal as well as rapid decompression situations. Thus, the sidewall 110 is a simple panel without any openings, slits, grills or the like, which significantly simplifies an admission and certification process of such aircraft component as well as the manufacturing of the sidewall 110.

The rapid decompression unit 130 mounted to the primary structure 150 and the cabin floor 120 forms a further gap between the sidewall 110 and a portion of the rapid decompression unit 130 closest to the sidewall 110. This portion closest to the sidewall 110 is in the illustrated example at the top end of the rapid decompression unit 130. In any case, at this further gap a distance D2 between the sidewall 110 and the closest portion of the rapid decompression unit 130 is between 1 inch and 2 inch (25.4 mm to 50.8 mm), preferably between 1 inch and 1.5 inch (25.4 mm to 38.1 mm). It was found that a 1 inch gap is sufficiently large for exhaust air removal. Nevertheless, the second distance D2 of this gap can be smaller than the first distance D1, as the second distance D2 gap is considered for regular exhaust air removal, while the first distance D1 gap is provided for regular exhaust air removal and rapid decompression.

FIG. 1 further illustrates an outer skin 152 of the aircraft 1, which delimits the interior space of the aircraft 1 towards an ambient environment. On an inner side of the outer skin 152 there can be arranged an insulation or other primary or secondary component of the aircraft 1 (all not illustrated for increased clarity of the drawing). As a mere example, an insulation could be arranged between two adjacent frames 150, and would form, at an inner side of the insulation, a boundary for the air stream behind the rapid decompression unit 130 (to the right of decompression unit 130 in FIG. 1).

The rapid decompression unit 130 comprises an opening 131 and a flap 132. In FIG. 1 the flap 132 is in a closed position, where it closes the opening 131, so that the opening 131 is actually not visible in FIG. 1. The flap 132 is pivotally mounted to a joint 134, preferably at a top and of the flap 132. This allows the flap 132 to reach or achieve the closed position easier due to gravity. In addition, a biasing element (not illustrated) can be provided, in order to bring and keep the flap 132 in the closed position. As a mere example, the rapid decompression unit 130 can be arranged at an angle, for example, corresponding to the angle of the primary structure 150 at the aircraft section 100. A biasing element would facilitate moving the flap 132 into the opening 131, i.e., into the closed position.

In case the pressure in the passenger cabin increases or decreases compared to the pressure in the space underneath the cabin floor 120, a decompression has to take place, in order to protect components of the aircraft 1. Since such pressure increase or decrease may occur suddenly, the regular exhaust air removal may not be sufficient to equalize the pressure fast enough, or in case air has to stream into the passenger cabin, the exhaust air path may not be wide enough.

The opening 131 in the rapid decompression unit 130 allows a fast decompression. As a mere example, a cross-sectional area of the opening 131 is larger than a cross-sectional area at the top end of the rapid decompression unit 130, such as the cross-sectional area of the gap, where the distance D2 is illustrated.

Figure 2:
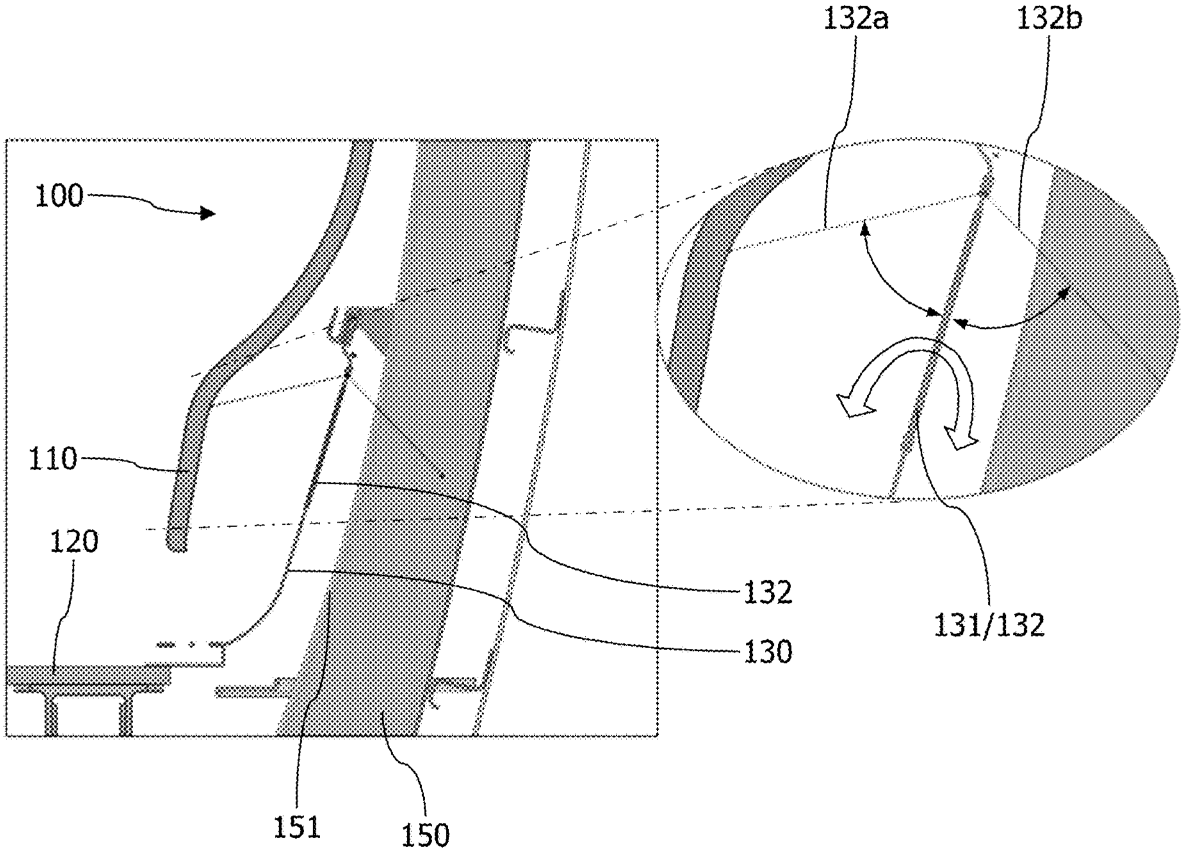
FIG. 2 schematically illustrates a cross-sectional view of the exemplary aircraft section of FIG. 1 with further details.

FIG. 2 schematically illustrates details of the aircraft section of FIG. 1. Specifically, the flap 132 is configured to move between the closed position and two opposite open positions 132*a* and 132*b*, thereby freeing the opening 131. In both cases, the flap is deflected in one of two opposite directions away from the opening 131.

As indicated in FIG. 2 by the wide double arrow, once the opening 131 is not blocked by the flap 132 anymore, air can stream into and out of the passenger cabin through the opening 131. Depending on the pressure difference, the flap opens towards the passenger cabin, in order to let air into the passenger cabin, or towards the primary structure 150 (or outer skin 152), in order to release air from the passenger cabin.

In any case, air can stream in front of the inner side 151 of the primary structure 150 and behind the rapid decompression unit 130. This inner side 151 can be, for example, an interior side of a frame 150, and/or an insulation (not illustrated) provided between two adjacent frames 150 or the like.

The rapid decompression unit 130 is mounted to the primary structure 150 in such a manner that a minimum distance from the inner side 151 of the primary structure 150 is met. In order to allow a sufficient air stream (sufficient volume or mass flow of air), such minimum distance can be at least 1 inch (25 to 4 mm).

Furthermore, the distance between the rapid decompression unit 130 and the inner side 151 of the primary structure 150 can increase from the opening 131 downwards to the cabin floor 120. Alternatively or additionally, the distance between the rapid decompression unit 130 and the inner side 151 can be wider than the second distance D2. In any case, this gap in the rapid decompression unit 130 and the inner side 151 underneath the opening 131 shall be sufficiently wide for the rapid decompression unit, i.e., should be wider than it would be required only for regular exhaust air removal.

Figure 3:
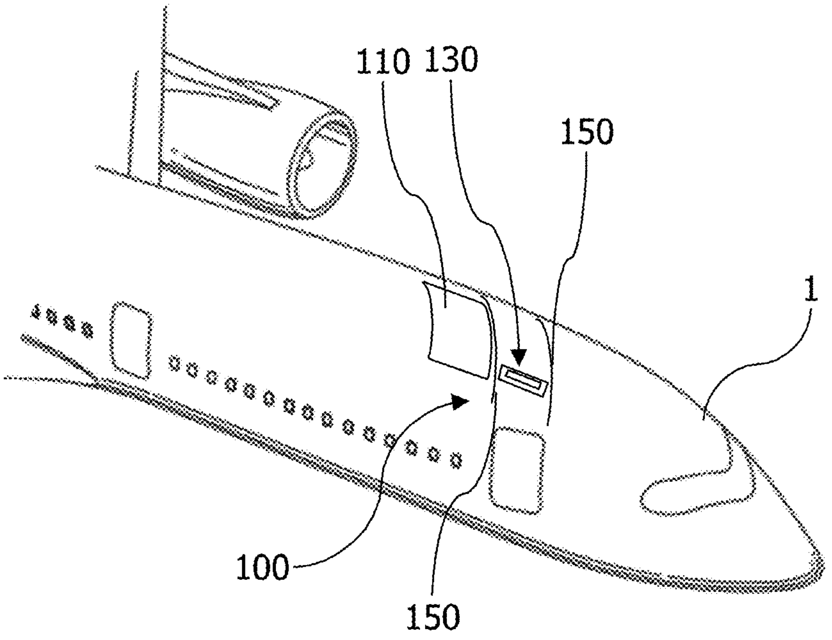
FIG. 3 schematically illustrates an aircraft comprising portions of an aircraft section.

FIG. 3 schematically illustrates an aircraft 1 comprising at least one aircraft section 100 as illustrated in FIGS. 1 and 2. In order to illustrate the components of the aircraft section 100, FIG. 3 illustrates only one side wall 110 and adjacent thereto two frames 150 (at least portions thereof). In a bottom region of the aircraft section 100, such as above the floor 120 (not illustrated in FIG. 3), there is arranged a rapid decompression unit 130 having an opening 131 covered by a flap 132 in its closed position. In the illustration of FIG. 3, the sidewall 110 has been removed, so that the rapid decompression unit 130 as well as the two frames 150 are visible.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft section, comprising:

a primary structure forming at least a portion of an aircraft fuselage;

a cabin floor coupled to the primary structure;

a sidewall covering at least a portion of the primary structure, the sidewall having a first surface exposed to a passenger cabin and a second surface facing the primary structure; and a rapid decompression unit arranged between the sidewall and the primary structure, wherein the sidewall has a bottom edge arranged above the cabin floor, wherein a first distance between the bottom edge and the cabin floor is between 1 inch and 3 inches, wherein the rapid decompression unit is mounted to the primary structure and the cabin floor, wherein a second distance between the sidewall and a portion of the rapid decompression unit closest to the sidewall is between 1 inch and 2 inches, wherein the first distance is greater than the second distance, wherein the first and second surfaces of the sidewall converge towards the rapid decompression unit to form the second distance.

2. The aircraft section of claim 1, wherein the rapid decompression unit comprises an opening, a flap, and a joint to which the flap is pivotally mounted, the flap being configured to close the opening when being in a closed position.

3. The aircraft section of claim 2, wherein the flap is configured to move between the closed position and two opposite open positions in which the flap is deflected in one of two opposite directions away from the opening.

4. The aircraft section of claim 1, wherein the rapid decompression unit is mounted to the primary structure at a minimum distance from an inner side of the primary structure.

5. The aircraft section of claim 4, wherein the minimum distance is at least 1 inch.

6. The aircraft section of claim 1, wherein a main portion of the sidewall is arranged substantially parallel to the primary structure, wherein a bottom region of the sidewall diverges from the primary structure.

7. The aircraft section of claim 6, wherein the bottom region covers the rapid decompression unit at least partially.

8. An aircraft, comprising:

at least one aircraft section according to claim 1.

* * * * *